April 16, 1957  J. J. PELOUCH  2,788,771
ROLLER BEARING AUTOMOBILE LIFT
Filed April 22, 1953  4 Sheets-Sheet 2

INVENTOR.
JAMES J. PELOUCH
BY
Woodling and Kroot
ATTYS.

*INVENTOR.*
JAMES J. PELOUCH
BY
Woodling and Krost
ATTYS.

United States Patent Office 2,788,771
Patented Apr. 16, 1957

2,788,771

ROLLER BEARING AUTOMOBILE LIFT

James J. Pelouch, Cleveland, Ohio, assignor, by mesne assignments, to Curtis Manufacturing Company, a corporation of Missouri Application April 22, 1953, Serial No. 350,472

14 Claims. (Cl. 121—46)

This invention relates to improvements in method and apparatus for causing telescopic bodies to move axially in spite of irregularities in the shape thereof.

An important object is to compensate for irregularities in a body by exercising forces acting substantially radially between two coaxial bodies at spaced points about their circumferences in varying degrees depending upon the shape of the cylinder throughout its circumference and/or length.

More particularly, the invention relates to method and apparatus designed to compensate for the out-of-roundness or irregularities in circular shape or lengthwise contour of the outside casing or guide cylinder of a hydraulic lift, and has for its main object to provide the piston with a self-conforming device to exert pressures upon the cylinder at spaced points about its periphery in order to achieve greater outer bearing surface in both off-center loads and center loads, to create less friction on the bearing surfaces whereby less air is required to operate the lift, to keep the piston or ram in straighter operating positions to balance the load and give longer packing life, to enable the use of out-of-round and shorter pipe for the cylinder, and to conserve on materials and require less machining of the piston and cylinder.

Other objects and advantages of the invention will become apparent during the course of the following description.

In the accompanying drawings forming a part of the description and wherein like numerals are employed to designate like parts throughout the several views.

Figure 1:
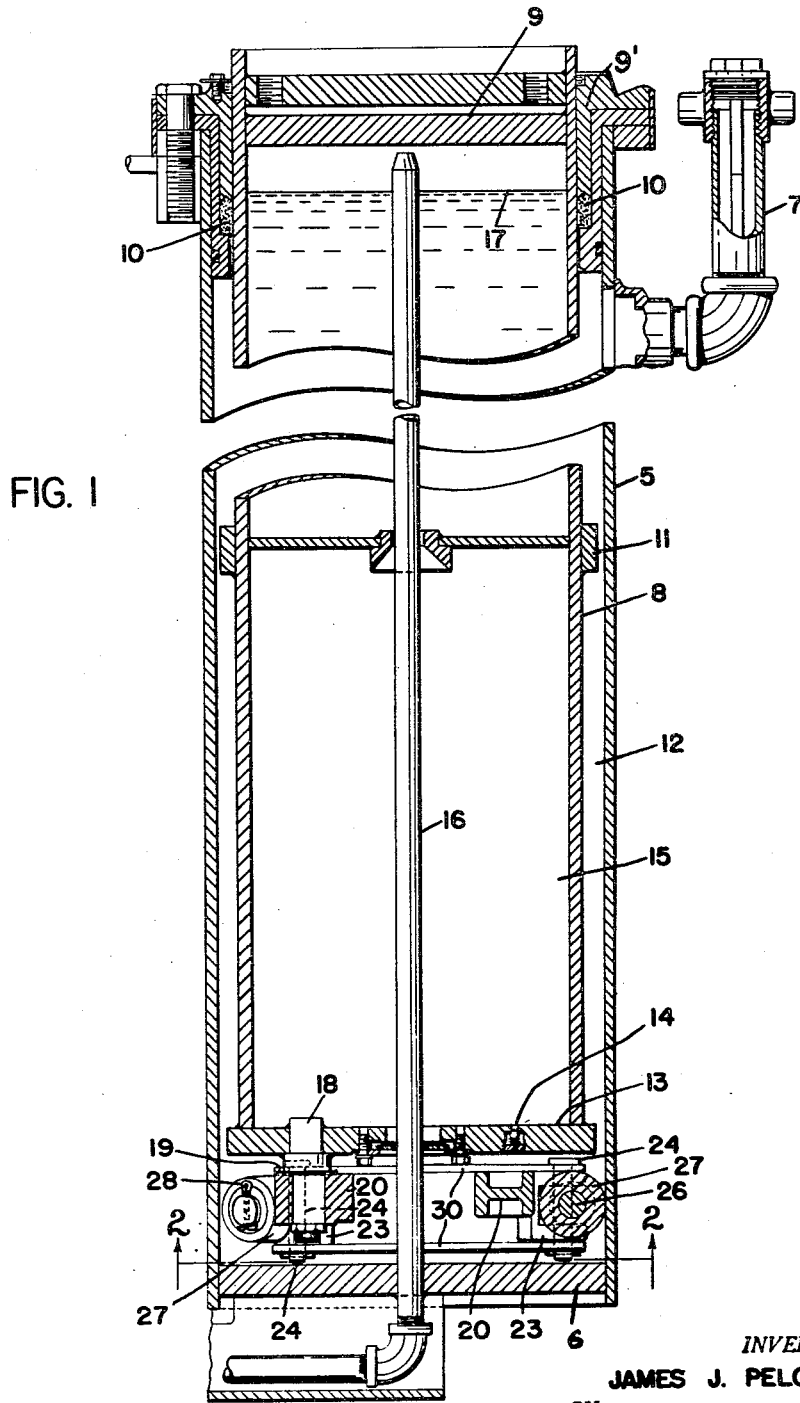
Figure 1 is a vertical longitudinal section through a ram and cylinder taken on line A—A of Figure 2.

Referring now more particularly to the drawings and wherein is shown for the purpose of illustration and not for limitation, a preferred example of the invention, the numeral 5 designates a cylinder with a closed bottom 6 of an air-hydraulic vehicle lift, which is sunk in a vertical position in the ground or other suitable bases with its upper end substantially flush with the ground line. An oil filler pipe 7 is provided in the upper side wall of the cylinder and rises above the ground for convenience of filling the apparatus with oil. A vertically movable piston or ram 8 is telescoped within the cylinder and is adapted to be moved upwardly and downwardly therein to raise and lower a load, such as a vehicle, sustained by a platform or super-structure secured above the closed upper end 9 of the ram in the usual manner in lifts of this character. The upper end of the cylinder 5 is provided with a bearing 9' having the usual inner packing gland and seal 10, which slidably engages the upper accurately machined portion of the ram 6 above the stop ring 11 for accurate guidance of the ram in perfect longitudinal alignment with the axis of the seal and cylinder. By reason of this seal 10 being of less diameter than the cylinder, the ram has its cylindrical walls radially spaced inwardly of the walls of the cylinder to form a clearance and an oil space 12. The lower end of the ram is closed by a wall 13 having a one-way check valve 14 therein which automatically opens on the upstroke of the ram to permit passage of oil from the ram chamber 15 into the bottom of the cylinder and clearance space 12, as compressed air is admitted through air duct 16 extending from a valved source of supply through the bottoms of the cylinder and ram vertically to a point adjacent the ram top 9 above the level 17 of oil or liquid therein. This head of compressed air acting upon the column of liquid in the ram chamber 15, causes the ram to be elevated. When the air head is exhausted through the air duct 16, the load upon the ram 8 causes it to lower and the check valve to close to allow the ram to descend slowly by oil pressure in the bottom of the cylinder being relieved through the clearance between the air duct 16 and the opening in the bottom wall of the ram through which the duct passes.

The cylinder and ram thus comprise a pair of coaxial or telescopic bodies having their cylindrical walls radially spaced apart to reduce friction therebetween. In prior devices, the lower inside walls of the cylinder 5 must be perfectly in-round and carefully machined to be concentric with the bearing 9' and seal 10, and the upper outside walls of the ram 8 above the stop ring 11 must be similarly in-round and machine to slide through this bearing and seal. In addition, in prior devices, the bottom wall 13 of the ram is extended radially to engage the cylinder walls and steady the lower end of the ram in order that the axis of the ram will run true to the center of the bearing 9' and seal 10 and will not tilt or rock to tilt the load and cause binding or excessive wear upon the seal. This means that the circumference of the extended piston wall 13 and the cylinder walls must also be accurately machined to be in-round and exactly concentric with the packing seal to guide the ram in a perfectly straight path.

The present invention provides method and means for compensating for out-of-roundness of the telescopic bodies, and dispenses with the necessity of accurate machining thereof. Broadly, this is accomplished by providing the bodies with centering means or a system of bearings for exerting pressure from one body to the other body at a plurality of spaced points around their circumference to cause them to slide or run true to each other or to a common longitudinal axis. In the present illustration of the invention, the bottom wall 13 of the ram is not radially extended as in prior devices engage the cylinder walls, but is spaced therefrom as shown in Figure 1 so that it is unnecessary to accurately finish the cylinder walls or the ram below the stop ring 11. Secured to the bottom wall 13 of the ram is a pair of depending fulcrum pins 18 parallel with the axis of the ram and having shoulders 19 spaced below the wall as shown. The two pins are arranged eccentrically and at diametrically opposite points spaced inwardly of the circumference of the wall 13 to form pivots for a pair of levers or bogies 20, which are freely oscillatable thereon. Nuts are threaded on the lower ends of the fulcrum pins to hold the levers 20 thereon. Each lever has a pair of arms 21 of equal length extending as a chord spanning substantially a ninety degree angle, and the free end of each arm is angularly extended at a forty-five degree angle from the arm 21 toward the circumference of the ram to be located closer the circumference than the fulcrum pins 18. Each free end 22 of each lever arm is provided with a forked portion 23 having a removable vertical pivot pin 24 parallel to the fulcrum pins 18, by which a member 25 in the form of an axle is pivotally connected medially of its ends with each lever arm 22. The pivot pins 24 are spaced ninety degrees apart and are thus arranged in equally spaced relation circumferentially of the ram. The axle members 25 extend through the forked portions 23 and equally at opposite sides thereof to provide a pair of axles 26 arranged perpendicularly to the pins 24. Each axle 25 extends somewhat as a chord and the centers of the two axle portions 26 are spaced forty-five degrees apart. The two rollers or bearings 27 of each axle member are spaced forty-five degrees apart circumferentially of the ram bottom 13. Upon each axle portion 26 is rotatably mounted an anti-friction roller bearing 27 having a crown shape to approximate the curvature of the cylinder walls. Washers and cotter pins 28 are employed to hold the rollers upon their axles 26 adjacent the shoulders 29 provided near the middle of the axle members. These shoulders 29 serve to space each pair of rollers about forty-five degrees apart, and there being eight rollers or bearings in the assembly, they engage the walls of the cylinder at substantially equally spaced points around its inner periphery as shown in Figure 2.

In order to balance or equalize pressure of the rollers against the cylinder wall, especially where the latter is out-of-round, the corresponding ends 23 of the levers 20 are interconnected by pairs of upper and lower equalizer links 30. One link of each pair is arranged on top of the lever-roller assembly and the other link on the bottom thereof, with each link having an opening at each end thereof to receive a pivot pin 24. Cotter pins run through the pivot pins 24 to retain the lower links in position. Thus, the pairs of links are arranged at diametrically opposite sides of the assembly and are generally parallel with each other.

Figure 2:
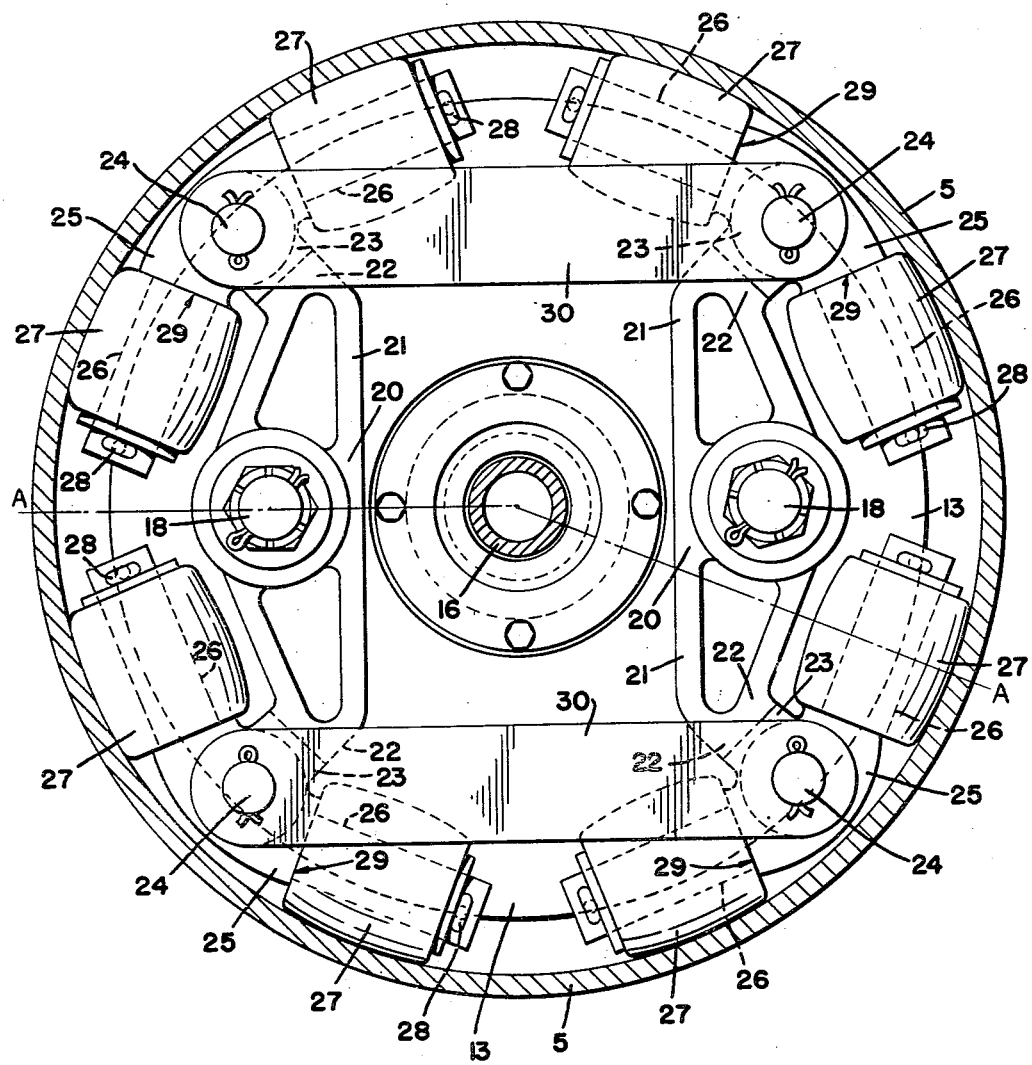
Figure 2 is a horizontal section taken on the line 2—2 of Figure 1.
Figure 3:
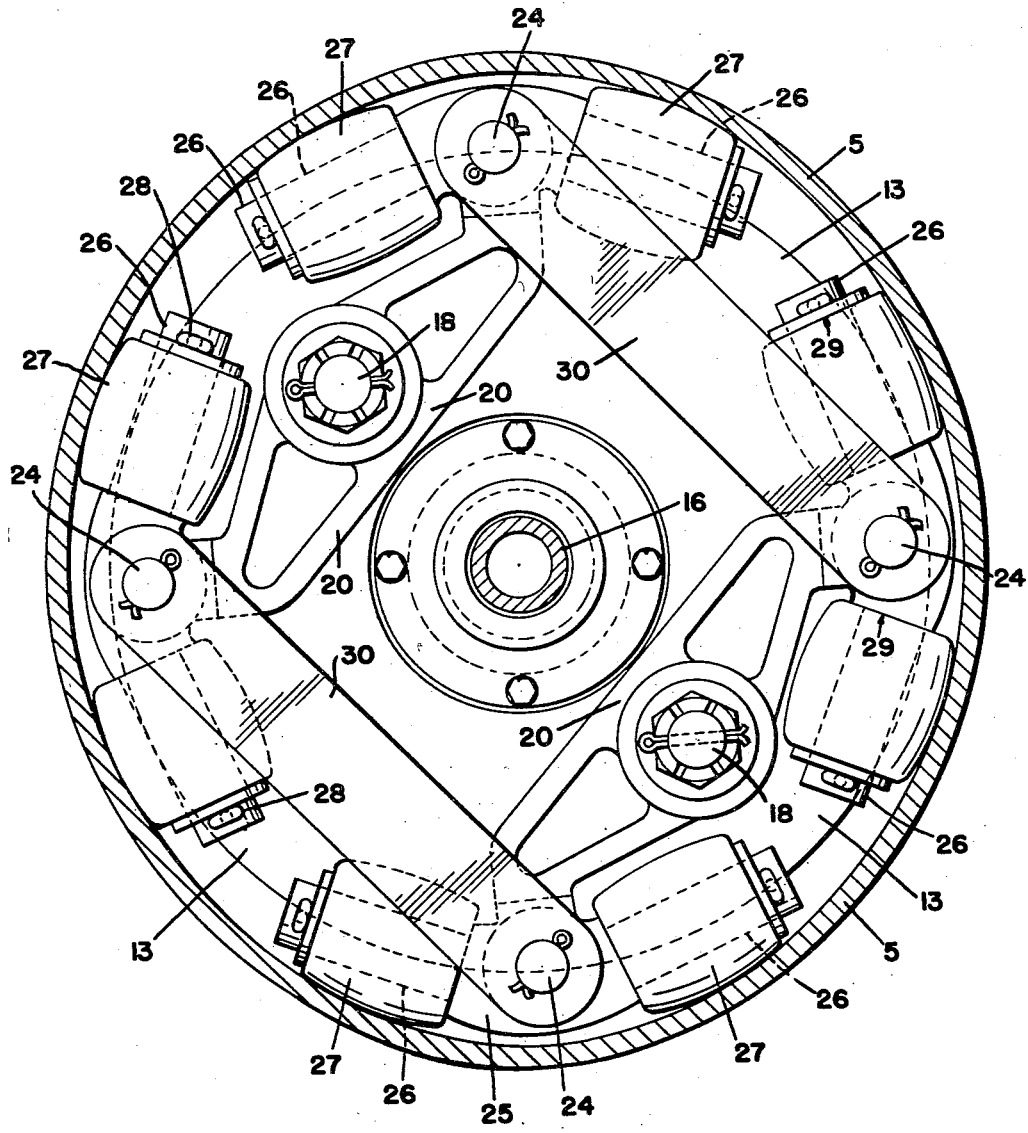
Figures 3 and 4 are horizontal sections taken on a line such as 2—2 of Figure 1 illustrating the relative positions of the various parts when engaged with out-of-round cylinders.
Figure 4:
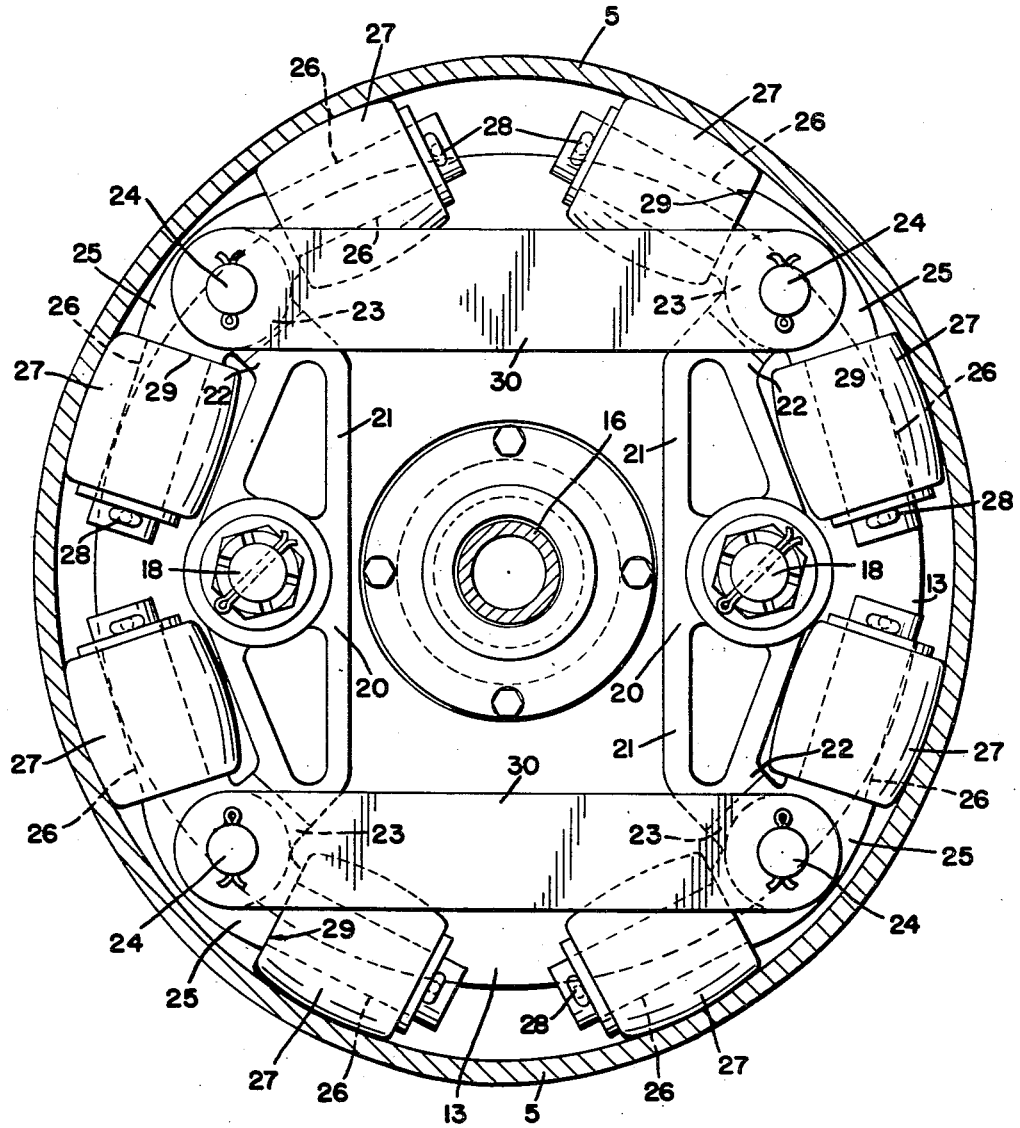

If the cylinder and ram are perfectly concentrically round, the levers or bogies, axles, rollers and links will assume the positions shown in Figure 2, whereas if the cylinder is out-of-round or elliptical as shown in Figures 3 and 4, the parts will assume the positions shown in the latter figures. In Figures 3 and 4, the major axis of the ellipse is vertical and Figure 3 illustrates the two levers 20 tilted with the two rollers of one axle member 25 engaging the cylinder on opposite sides of the intersection of the major axis with the ellipse, whereas Figure 4 illustrates the levers 20 not tilted, but rather the axle members 25 tilted with the rollers of bearings of two separate axle members 25 engaging the cylinder at opposite sides of such major axis; thus demonstrating the self-conformability of the lever and roller assembly of the ram to the irregular contour of the cylinder walls.

These elliptical shapes of cylinders are shown exaggerated, but from them will be observed that the axle members 25 will pivot on the pins 24 to project one or both of their rollers or bearings 27 into a major axis or to move them to conform to a minor axis. At times, when both bearings 27 of an axle move outwardly to major axes, the lever 20 carrying such bearings will be swung on its fulcrum 18 to move its other pair of rollers of bearings inwardly toward the center of the ram to conform to the shape contacted. Whenever the levers 20 are swung on their fulcrums, they will operate the links 30 to cause the corresponding ends of the complementary lever to move relative to the cylinder wall to insure pressure of all rollers or bearings of the assembly against the cylinder walls. This will keep the ram running straighter and with its axis running true to the center of the bearing 9' to give longer bearing and packing life. The anti-friction rollers or bearings will obviously create less friction upon bearing surfaces and enable the lift to be operated with less air pressure. In addition, the lower portion of the ram will not require the high degree of machining necessary in other lifts and will operate successfully with out-of-round and irregular shaped cylinder and will not require as long a piston or ram as in other lifts.

From the foregoing, it will be obvious that one of these self-conforming assemblies can be mounted at or near each end of one of the bodies and that various changes in the size, shape and relation of the various parts, may be made without departing from the spirit of the invention or the scope of the appended claims.

What is claimed is:

1. Means for coaxially mounting a first substantially cylindrical body and a second substantially cylindrical body with their walls in spaced relation whereby the said bodies can freely move relatively, said means including means carried by one of said bodies at points spaced about its axis to engage the walls of the other of said bodies, said aforementioned means being pivotally mounted on an axis parallel with and spaced from the axis of said first named body.

2. Means for coaxially mounting a first substantially cylindrical body and a second substantially cylindrical body with their walls in spaced relation whereby said bodies can move relatively, said means including a plurality of levers each pivotally mounted upon one of said bodies on an axis parallel to the axis of said body, bearings mounted upon said levers on axes perpendicular to aforesaid axis of said body to engage the walls of said other body, and a link connecting corresponding ends of said levers to cause corresponding movement thereof.

3. Means for coaxially mounting a first substantially cylindrical body and a second substantially cylindrical body with their walls in spaced relation whereby said bodies can move relatively, said means including a plurality of levers each pivotally mounted upon one of said bodies on an axis parallel to the axis of said body, and bearings mounted upon axles pivotally mounted on the ends of said levers on axes parallel to the aforesaid axis to engage the walls of said other body.

4. Means for coaxially mounting a first substantially cylindrical body and a second substantially cylindrical body with their walls in spaced relation whereby said bodies can freely move relatively, said means including a plurality of levers each pivotally mounted upon one of said bodies on an axis parallel to the axis of said body, axles pivotally mounted on the ends of said levers on axes parallel with said lever axes, and bearings mounted on said axles to engage the walls of said other body.

5. Means for coaxially mounting a first substantially cylindrical body and a second substantially cylindrical body with their walls in spaced relation whereby said bodies can move relatively, said means including a pair of levers each arranged chordally of said first body and pivotally mounted between their ends diametrically opposite each other upon said first body on an axis parallel with the axis of said body, an axle pivotally mounted between its ends on each end of each lever on an axis parallel with said axis of said body, and bearings mounted on said axles to engage the walls of said other body.

6. Means for coaxially mounting a first substantially cylindrical body and a second substantially cylindrical body with their walls in spaced relation whereby said bodies can move relatively, said means including a pair of levers each arranged chordally of said first body and pivotally mounted between their ends diametrically opposite each other upon said first body on an axis parallel with the axis of said body, an axle pivotally mounted between its ends on each end of each lever on an axis parallel with said axis of said body, said axles being perpendicular to their pivots, and bearings mounted on said axles to engage the walls of said other body.

7. Means for coaxially mounting a first substantially cylindrical body and a second substantially cylindrical body with their walls in spaced relation whereby said bodies can move relatively, said means including a pair of levers each arranged chordally of said first body and pivotally mounted between their ends diametrically opposite each other upon one body on an axis parallel with the axis of said body, an axle pivotally mounted between its ends on each end of each lever on an axis parallel with said axis of said body, anti-friction devices mounted on said axles to engage the walls of said other body, and a link connecting corresponding ends of said levers to cause corresponding movement of said lever ends.

8. Means for coaxially mounting a first substantially cylindrical body and a second substantially cylindrical body with portions of their walls in radially spaced relation whereby said bodies can move relatively, said means including a pair of levers each pivotally mounted upon one of said bodies on an axis parallel with the axis of said body, a member pivotally mounted between its ends on the free end of each lever on an axis parallel with said axis of said last named body, and a bearing mounted upon each member on each side of the pivot thereof.

9. Means for coaxially mounting a first substantially cylindrical body and a second substantially cylindrical body with their walls in spaced relation whereby said bodies can move relatively, said means including a pair of levers each arranged chordally of said first body and pivotally mounted between their ends diametrically opposite each other upon one of said bodies on an axis parallel with the axis of said body, an axle pivotally mounted between its ends on each end of each lever on an axis parallel with said axis of said last named body, a pair of rollers mounted on each of said axles making a total of at least eight rollers to engage the walls of said other body, and links connecting corresponding ends of said levers.

10. The combination with first and second substantially coaxial bodies, said first body having a guide surface spaced from said second body and from the axis thereof; of a centering device to center said bodies and including a plurality of relatively movable bearings, pivot means mounting said movable bearings to said second body, said movable bearings engageable with said guide surface, equalizer links connecting certain of said bearings whereby the movement of one of said bearings in a general direction toward said axis caused by its engagement with said guide surface transmits substantially equal unyielding movement to other of said bearings against said guide surface and in a general direction away from said axis.

11. The combination with first and second substantially coaxial bodies, said first body having a guide surface spaced from said second body and from the axis thereof; of a centering device to center said bodies and including a plurality of relatively movable bearings, at least two bearings interconnected by a lever member, said lever member pivotally carried by said second body whereby movement of a first one of said bearings in a general direction toward said axis caused by its engagement with said guide surface transmits substantially equal movement to a second one of said bearings against said guide surface at a place spaced substantially ninety degrees from said first bearing and in a general direction away from said axis.

12. The combination with first and second substantially coaxial bodies, said first body having a guide surface with portions thereof spaced different radial distances from said second body and from the axis thereof; of a centering device to center said bodies and including a pair of diametrically disposed levers each pivoted between its ends to said second body on an axis substantially parallel with the axis of said bodies, and a bearing mounted by each end of each lever and engaging said guide surface.

13. The combination with first and second substantially coaxial bodies, said first body having a guide surface with portions thereof spaced different radial distances from said second body and from the axis thereof; of a centering device to center said bodies and including a pair of diametrically disposed levers each pivoted between its ends to said second body on an axis substantially parallel with the axis of said bodies, and a bearing mounted by each end of each lever and engaging said guide surface, said bearings being spaced substantially forty-five degrees apart.

14. The combination with first and second substantially coaxial bodies, said first body having a guide surface with portions thereof spaced different radial distances from said second body and from the axis thereof; of a centering device to center said bodies and including a pair of diametrically disposed levers each pivoted between its ends to said second body on an axis substantially parallel with the axis of said bodies, a bearing mounted by each end of each lever and engaging said guide surface, a first equalizer link extending between and pivotally connected to a first end portion of each of said levers and a second equalizer link extending between and pivotally connected to another end portion of each of said levers.

References Cited in the file of this patent

UNITED STATES PATENTS

| | | |
|---|---|---|
| 333,468 | Hutchinson | Dec. 29, 1885 |
| 952,044 | Larsson et al. | Mar. 15, 1910 |
| 1,690,721 | Dillon | Nov. 6, 1928 |
| 1,868,935 | Breneman | July 26, 1932 |
| 1,898,074 | Bailey | Feb. 21, 1933 |
| 2,137,743 | Strassman | Nov. 22, 1938 |
| 2,204,365 | Klemm | June 11, 1940 |

FOREIGN PATENTS

| | | |
|---|---|---|
| 700,428 | France | Feb. 28, 1931 |
| 726,482 | Germany | Oct. 14, 1942 |